US010411442B2

(12) United States Patent
Cortes Rico

(10) Patent No.: US 10,411,442 B2
(45) Date of Patent: Sep. 10, 2019

(54) HOLD-DOWN AND BEND-AWAY BRACKET AND BRACKET ASSEMBLY

(71) Applicant: Siemens Industry, Inc., Alpharetta, GA (US)

(72) Inventor: Gustavo Cortes Rico, Suwanee, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 417 days.

(21) Appl. No.: 15/151,083

(22) Filed: May 10, 2016

(65) Prior Publication Data

US 2017/0328515 A1 Nov. 16, 2017

(51) Int. Cl.
*F16B 17/00* (2006.01)
*F16B 5/00* (2006.01)
*H02B 1/26* (2006.01)

(52) U.S. Cl.
CPC ............... *H02B 1/26* (2013.01); *F16B 17/00* (2013.01); *F16B 5/00* (2013.01); *Y10T 24/44026* (2015.01)

(58) Field of Classification Search
CPC .. H02B 1/26; F16B 17/00; F16B 5/00; H05K 7/142; G06F 1/184; Y10T 24/44017; Y10T 24/44026; E04B 1/40; E04B 2001/2415; E04B 2001/405
USPC .................. 248/500, 227.1–227.2, 300–301, 248/304–306, 503, 510, 544; 361/810
See application file for complete search history.

(56) References Cited

U.S. PATENT DOCUMENTS

| | | | | | |
|---|---|---|---|---|---|
| 1,342,659 | A | * | 6/1920 | Wright | A01B 35/22 248/292.12 |
| 2,264,666 | A | * | 12/1941 | Hexdall | F16L 3/006 248/217.3 |
| 2,733,492 | A | * | 2/1956 | Copell | A24F 9/14 24/457 |
| 2,886,270 | A | * | 5/1959 | Wendela | F16L 3/04 24/132 R |
| 3,125,177 | A | * | 3/1964 | Paller | F16B 2/06 180/68.5 |
| 3,347,504 | A | * | 10/1967 | Goss | A47G 1/10 248/201 |
| 3,656,212 | A | * | 4/1972 | Velte | A44B 99/00 135/119 |
| 3,704,563 | A | * | 12/1972 | Waller | E06B 3/5481 160/369 |

(Continued)

*Primary Examiner* — Ingrid M Weinhold

(57) ABSTRACT

A bracket comprises a first bracket configured to hold-down an assembly in place and release the assembly when the assembly is to be removed. The assembly has first and/or second holes. The first bracket includes a first arm and a second arm. The first arm has a first major flat surface with a first hole that is configured to receive a first fastener. The first arm has a first end and a second end. The second arm is coupled to the second end of the first arm. The second arm has a first opening that is configured to receive a tool to bend the second arm for deforming the first bracket in a way that releases the assembly. The second arm has a second major flat surface disposed transverse to the first major flat surface of the first arm. The second arm has a first end and a second end. The second end of the second arm has a first nail feature to be inserted into one of the first and/or second holes of the assembly to hold-down the assembly in place.

20 Claims, 6 Drawing Sheets

(56) References Cited

U.S. PATENT DOCUMENTS

| | | | | |
|---|---|---|---|---|
| 3,787,024 A | * | 1/1974 | Dzus, Jr. | B25B 5/08 248/503 |
| 3,844,548 A | * | 10/1974 | Rogers | B23Q 35/46 269/905 |
| 4,133,085 A | * | 1/1979 | Hansson | F16B 2/14 24/457 |
| 4,440,374 A | * | 4/1984 | Achille | F16B 2/22 248/544 |
| 4,464,821 A | * | 8/1984 | Haytayan | B22D 7/108 164/137 |
| 4,545,103 A | * | 10/1985 | Bryant | E04D 3/3602 29/432 |
| 4,680,915 A | * | 7/1987 | Bush | E06B 3/5481 248/504 |
| 4,766,707 A | * | 8/1988 | Knudson | B21D 28/36 52/715 |
| 4,896,985 A | * | 1/1990 | Commins | E04B 1/2612 248/544 |
| 5,036,567 A | * | 8/1991 | Clinch | F16B 21/086 24/297 |
| D327,214 S | * | 6/1992 | Stuart | D8/373 |
| 5,293,015 A | * | 3/1994 | Yuda | F15B 15/2892 200/294 |
| 5,390,460 A | * | 2/1995 | Llorens | E04B 7/20 52/489.1 |
| 5,674,023 A | * | 10/1997 | Williams | F16B 2/065 174/158 R |
| 5,732,524 A | * | 3/1998 | Kalker, Jr. | E04B 1/2608 403/232.1 |
| 5,810,303 A | * | 9/1998 | Bourassa | H02G 3/126 174/58 |
| 5,885,024 A | * | 3/1999 | Zupan | E04D 1/34 248/300 |
| 6,009,681 A | * | 1/2000 | Kozloff | E04B 1/2608 403/237 |
| 6,079,765 A | * | 6/2000 | Zaguskin | B60R 16/02 248/68.1 |
| 6,246,584 B1 | * | 6/2001 | Lee | H01L 23/4093 24/458 |
| 6,435,759 B1 | * | 8/2002 | Root | H02B 1/30 248/227.1 |
| 6,477,050 B1 | * | 11/2002 | Herring | H01L 23/4006 165/185 |
| 6,510,666 B1 | * | 1/2003 | Thompson | E04B 1/2608 52/264 |
| 6,513,776 B1 | * | 2/2003 | Bissett | B05B 13/02 173/171 |
| 6,585,448 B2 | * | 7/2003 | Grossman | F16B 12/46 403/403 |
| 7,345,880 B2 | * | 3/2008 | Lo | G06F 1/183 165/185 |
| D637,898 S | * | 5/2011 | Tedesco | D8/380 |
| D640,916 S | * | 7/2011 | Sias | D8/382 |
| D655,149 S | * | 3/2012 | Dotsey | D8/354 |
| 8,176,689 B1 | * | 5/2012 | Thompson | E04B 1/2608 52/702 |
| 8,616,516 B2 | * | 12/2013 | Rittner | B64C 1/403 24/453 |
| 8,867,211 B2 | * | 10/2014 | Wiltzius | H01L 23/4006 165/80.3 |
| 9,772,049 B2 | * | 9/2017 | Billimack | F16L 3/04 |
| 2003/0127577 A1 | * | 7/2003 | Brown | B25H 3/006 248/304 |
| 2003/0160141 A1 | * | 8/2003 | Yamanashi | B60H 1/00535 248/300 |
| 2003/0209632 A1 | * | 11/2003 | Hessling | B64C 1/066 244/119 |
| 2009/0184506 A1 | * | 7/2009 | Hughes | B60R 11/00 280/756 |
| 2010/0058681 A1 | * | 3/2010 | Lucey | E04B 1/2604 52/167.3 |
| 2011/0097137 A1 | * | 4/2011 | Spitz | F16B 2/243 403/33 |

\* cited by examiner

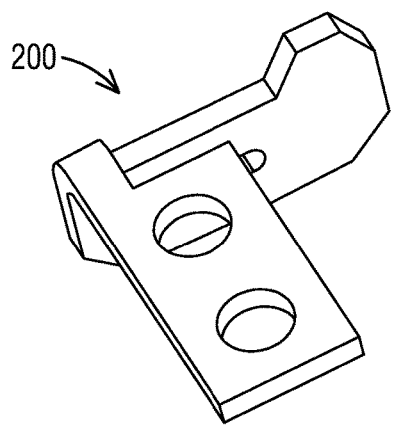
FIG. 8
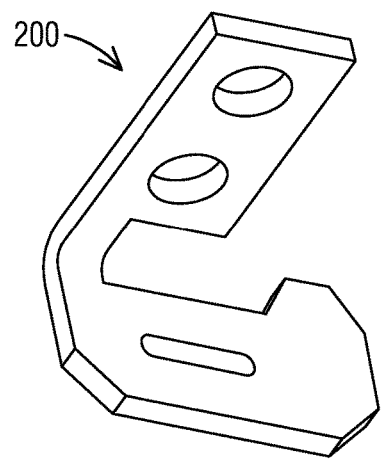
FIG. 9
FIG. 10
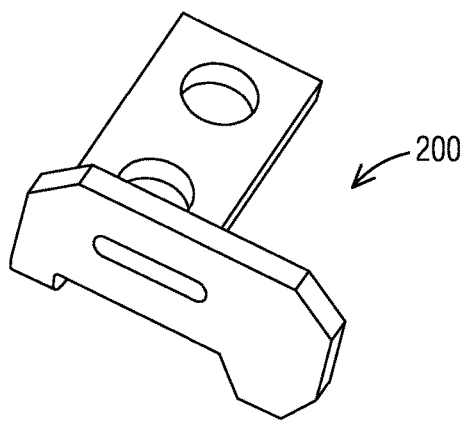
FIG. 11
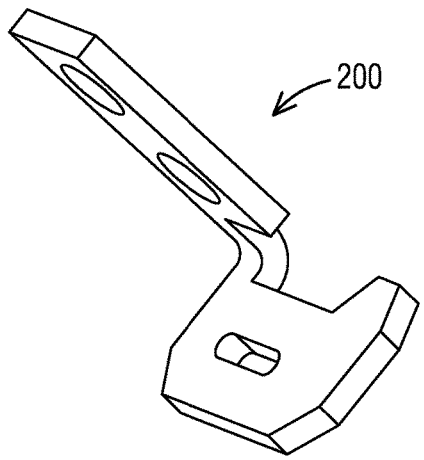

HOLD-DOWN AND BEND-AWAY BRACKET AND BRACKET ASSEMBLY

BACKGROUND

1. Field

Aspects of the present invention generally relate to brackets and more specifically relate to a bracket and/or a bracket assembly for bolting an object such as an assembly to a side wall of an enclosure such as power module enclosures.

2. Description of the Related Art

Various types of brackets are in current use, each having multiple parts or requiring various degrees of effort and time to install or uninstall. Brackets are commonly used in structures for securing numerous types of components to the structure to brace the components against any movement.

However, an assembly may be held to a structure with two bolts without needing a bracket. Removing the assembly although takes considerable time and effort because the bolts of the assembly must be completely undone to de-attach it from the structure.

There may be many problems associated with undoing the two bolts. For example, a user has to unwind the two bolts. This is difficult due to limited space and bolts may be facing towards the center of an enclosure. It may take several turns of a screw driver in order to remove screws or nuts of the bolts. There may be a little room to insert a tool and an approach angle may make it almost a "blind operation." Moreover, there will be loose parts that may get misplaced. Additionally, it may be too slow a way to remove the assembly from the enclosure. It may not be easier to reach the assembly and one may need to reach by hand deep in the enclosure.

Therefore, there is a need for improvements in bolting an assembly to an enclosure such that the assembly may be readily removed from its installed position without facing inoperable or difficult conditions in its removal.

SUMMARY

Briefly described, aspects of the present invention relate to a bracket that is configured to hold-down an object and may be bent-away to easily release the object form its installed location. The bracket may have an L-shape. One side of the L-shape is used to affix the bracket to a side wall of an enclosure and other side has a shape that holds an assembly in place. The bracket has an opening that is used to insert a tool like a screw-driver and bend or deform the bracket which in turn releases the assembly. One of ordinary skill in the art appreciates that such a bracket or a bracket assembly including a pair of sub-brackets can be configured to be installed in different environments where a quick bolting feature is used, for example in power module enclosures.

In accordance with one illustrative embodiment of the present invention, a bracket comprises a first bracket configured to hold-down an assembly in place and release the assembly when the assembly is to be removed. The assembly has first and/or second holes. The first bracket includes a first arm and a second arm. The first arm has a first major flat surface with a first hole that is configured to receive a first fastener. The first arm has a first end and a second end. The second arm is coupled to the second end of the first arm. The second arm has a first opening that is configured to receive a tool to bend the second arm for deforming the first bracket in a way that releases the assembly. The second arm has a second major flat surface disposed transverse to the first major flat surface of the first arm. The second arm has a first end and a second end. The second end of the second arm has a first nail feature to be inserted into one of the first and/or second holes of the assembly to hold-down the assembly in place.

Consistent with another embodiment, a bracket assembly is described. The bracket assembly comprises a first bracket and a second bracket. The first bracket is configured to hold-down an assembly in place and release the assembly when the assembly is to be removed. The assembly has first and/or second holes. The first bracket includes a first arm having a first hole that is configured to receive a first fastener such as a first screw or a first rivet or having a portion configured for welding to an enclosure surface. The first bracket further includes a second arm coupled to the first arm. The second arm has a first opening that is configured to receive a tool to bend the second arm for deforming the first bracket in a way that releases the assembly. The second arm has a first nail feature to be inserted into one of the first and/or second holes of the assembly to hold-down the assembly in place. The second bracket is configured to hold-down the assembly in place and release the assembly when the assembly is to be removed. The second bracket includes a first arm having a second hole that is configured to receive a second fastener as a second screw or a second rivet or having a portion configured for welding to the enclosure surface. The second bracket further includes a second arm coupled to the first arm. The second arm having a second opening that is configured to receive the tool to bend the second arm for deforming the second bracket in a way that releases the assembly. The second arm has a second nail feature to be inserted into one of the first and/or second holes of the assembly to hold-down the assembly in place.

According to yet another embodiment of the present invention, a method of bolting an assembly to an enclosure with a bracket assembly is described. The method comprises providing a first bracket configured to hold-down an assembly in place and release the assembly when the assembly is to be removed. The assembly has at least one of first and second holes. The first bracket includes a first arm having a first hole that is configured to receive a first fastener such as a first screw or a first rivet or having a portion configured for welding to an enclosure surface. The first bracket further includes a second arm coupled to the first arm. The second arm has a first opening that is configured to receive a tool to bend the second arm for deforming the first bracket in a way that releases the assembly. The second arm has a first nail feature to be inserted into one of the at least one of the first and second holes of the assembly to hold-down the assembly in place. The method further comprises providing a second bracket configured to hold-down the assembly in place and release the assembly when the assembly is to be removed. The second bracket includes a first arm having a second hole that is configured to receive a second fastener as a second screw or a second rivet or having a portion configured for welding to the enclosure surface. The second bracket further includes a second arm coupled to the first arm. The second arm has a second opening that is configured to receive the tool to bend the second arm for deforming the second bracket in a way that releases the assembly. The second arm has a second nail feature to be inserted into one of the at least one of the first and second holes of the assembly to hold-down the assembly in place.

BRIEF DESCRIPTION OF THE DRAWINGS

FIGS. 7-11 each illustrate an oblique view of the bracket in FIG. 2 in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of a bracket with a bend having a lesser width than two arms of the bracket, a bracket with a bend having a lesser thickness than a thickness of two arms of the bracket and a bracket assembly including first and second brackets to secure an assembly to a side wall of an enclosure. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In power module enclosures, a quick bolting feature is used, for example, to keep an assembly or a part in place until the assembly needs to be removed or used. A bracket with a bend or a bracket assembly with a pair of brackets may be used depending upon the assembly or the part being held. When the assembly needs to be removed then these brackets are simply bent away, thus releasing the assembly from the side wall of the enclosure on which it was installed. When the assembly does not need to be removed then the bracket just stays in place as-is. There are many advantages of the bracket with a bend or the bracket assembly with a pair of brackets. For example, it may take half a turn of the hand with a screw-driver per each bracket to release the assembly from its position. There are no loose parts that may get lost. It is relatively faster to remove the assembly than un-screwing two bolts. It is also much easier to reach the bracket directly from the front. There is no need to reach by hand deep in the enclosure. Smaller enclosures may be designed by needing comparably less space for a small tool that bends the bracket instead of a tool that requires hand holding of the tool.

Figure 1:
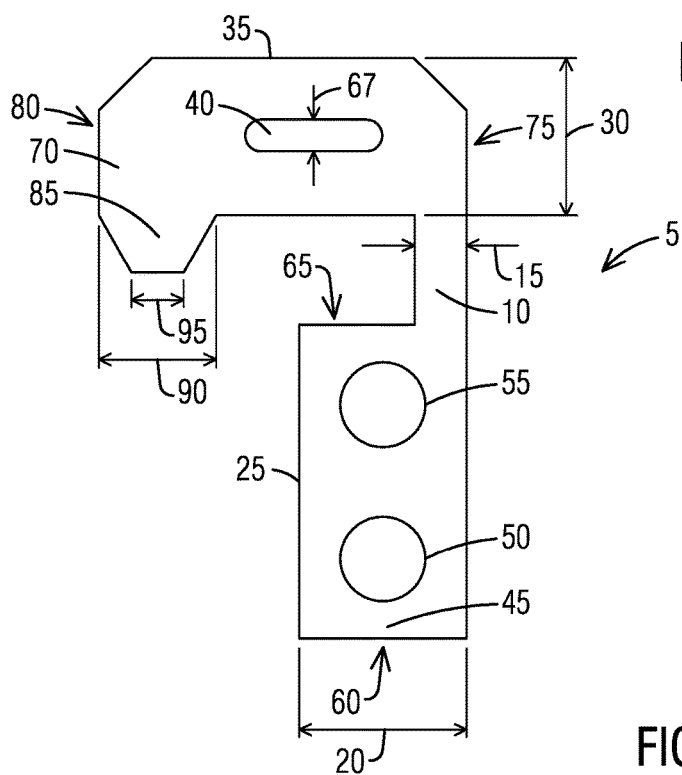
FIG. 1 illustrates a schematic of a bracket without a bend in accordance with an exemplary embodiment of the present invention.

FIG. 1 illustrates a schematic of a bracket 5 without a bend in accordance with an exemplary embodiment of the present invention. The bracket 5 including a bend portion 10 having a lesser width (w) 15 than a first width (fw) 20 of a first arm 25 of the bracket 5 and/or a second width (sw) 30 of a second arm 35 of the bracket 5 in accordance with an exemplary embodiment of the present invention. For example, the lesser width (w) 15 may be ⅓ of either the first width (fw) 20 of the first arm 25 of the bracket 5 or the second width (sw) 30 of the second arm 35 of the bracket 5.

In one embodiment, the lesser width (w) 15 may be 0.125 units, the first width (fw) 20 of the first arm 25 of the bracket 5 may be 0.4 units and the second width (sw) 30 of the second arm 35 of the bracket 5 may be 0.375 units. A smaller size of the lesser width (w) 15 relative to the first width (fw) 20 of the first arm 25 of the bracket 5 and the second width (sw) 30 of the second arm 35 of the bracket 5 enables bending of the second arm 35 by inserting a tool such as a flat screw-driver's head in a first opening 40 of the second arm 35. This bending can be accomplished by applying a force using a hand to lift the second arm 35 up. A typical force from an average person may be sufficient to bend the second arm 35 at the bend portion 10.

The bracket 5 is configured to hold-down an assembly (not shown, see FIGS. 12-16) in place and release the assembly when the assembly is to be removed. The assembly may have first and/or second holes. The bracket 5 includes the first arm 25 having a first major flat surface 45 with a first hole 50 that is configured to receive a first fastener (not shown, see FIGS. 12-16). The first major flat surface 45 includes a second hole 55 that is configured to receive a second fastener.

The first arm 25 is configured to affix the bracket 5 to a side wall of an enclosure and the second arm 35 is configured to hold the assembly in place. The first arm 25 has a first end 60 and a second end 65. The second arm 35 is coupled to the second end 65 of the first arm 25. The second arm 35 has the first opening 40 that is configured to receive a tool to bend the second arm 35 for deforming the bracket 5 in a way that releases the assembly. For example, the first opening 40 may have a first opening width (fow) 67. In one embodiment, the first opening width (fow) 67 may be 0.75 units.

The second arm 35 has a second major flat surface 70 disposed transverse to the first major flat surface 45 of the first arm 25. For example, the second major flat surface 70 may be disposed at 90° angle to the first major flat surface 45. However, other suitable angles may be used based on a particular application and a specific implementation. The first arm 25 and the second arm 35 define an L-shape. One side of this L-shape is used to affix the bracket 5 to a side wall of an enclosure and other side has a shape that holds an assembly in place.

The second arm 35 has a first end 75 and a second end 80. The second end 80 of the second arm 35 includes a first nail feature 85 to be inserted into one of the first and/or second holes of the assembly to hold-down the assembly in place. For example, the first nail feature 85 may have a top nail width (tnw) 90 and a bottom nail width (bnw) 95. In one embodiment, the top nail width (tnw) 90 may be 0.280 units and the bottom nail width (bnw) 95 may be 0.125 units.

According to one embodiment, the first nail feature 85 may be a wedge-shaped pointed tab projecting from one end thereof provided for the necessary securement of the assembly with the bracket 5 to the side wall of an enclosure. The wedge-shaped pointed tab of the first nail feature 85 is configured to provide a mating overlap within a hole in the assembly for affording an inter-lock securement of the bracket 5 to the assembly being attached or hinged to the sidewall of an enclosure and yet enabling disconnecting the first nail feature 85 from within the hole in the assembly.

In operation, the second arm 35 with the first nail feature 85 is to be bent with a tool at an angle such as 45° from the horizontal, which removes the force and resistance from it on the assembly by lifting the second arm 35 away from the horizontal. However, it is contemplated by the inventor that depending upon a height of a hole of the assembly or a thickness of a base with a hole of the assembly, this bending angle of the second arm 35 may vary from 20° to 80° from the horizontal.

In one embodiment, the bracket 5 is preferably constructed of a steel sheet metal ranging from 20 gauge to about 10 gauge. The bracket 5 is preferably flat and defines a pair of fastener receiving holes or apertures disposed along a central longitudinal axis thereof. Consistent with one embodiment, the bracket 5 may be made of a stamped piece of metal. One example of the stamped piece of metal is steel. In particular, the bracket 5 may be made of the 14 gage steel. However, other suitable sizes and materials may be used based on a particular application and a specific implementation.

Figure 3:
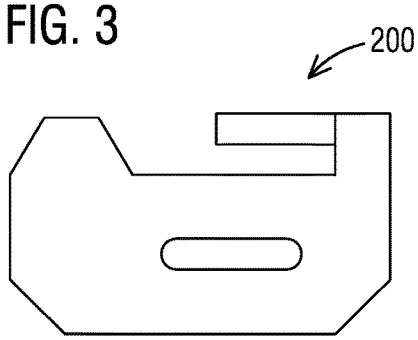
FIG. 3 illustrates a schematic of a back view of the bracket in FIG. 2 in accordance with an exemplary embodiment of the present invention.
Figure 2:
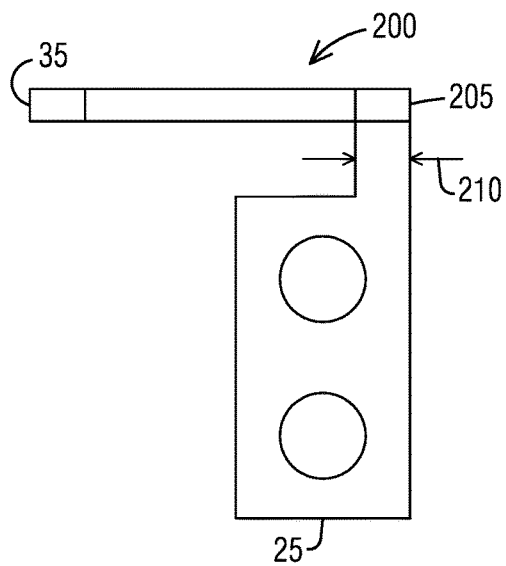
FIG. 2 illustrates a schematic of a top view of a bracket with a bend having a lesser width than two arms of the bracket in accordance with an exemplary embodiment of the present invention.
Figure 4:
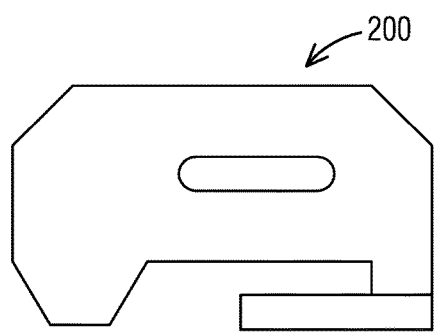
FIG. 4 illustrates a schematic of a front view of the bracket in FIG. 2 in accordance with an exemplary embodiment of the present invention.
Figure 5:
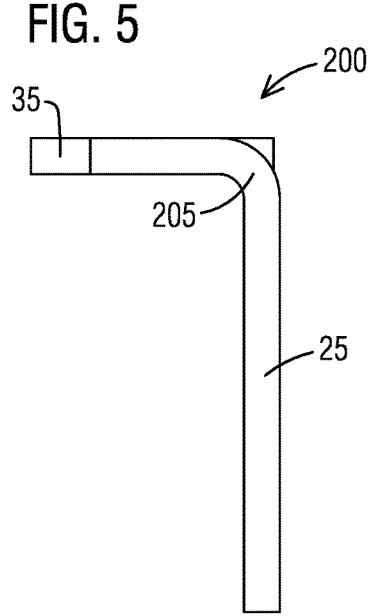
FIG. 5 illustrates a schematic of a side view of the bracket in FIG. 2 in accordance with an exemplary embodiment of the present invention.

Referring to FIG. 2, it illustrates a schematic of a top view of a bracket 200 with a bend 205 having a lesser width (lw) 210 than a width of the first and second arms 25, 35 of the bracket 200 in accordance with an exemplary embodiment of the present invention. Turning now to FIG. 3, it illustrates a schematic of a back view of the bracket 200 shown in FIG. 2 in accordance with an exemplary embodiment of the present invention. FIG. 4 illustrates a schematic of a front view of the bracket 200 shown in FIG. 2 in accordance with an exemplary embodiment of the present invention. As shown in FIG. 5, it illustrates a schematic of a side view of the bracket 200 shown in FIG. 2 in accordance with an exemplary embodiment of the present invention.

Figure 6:
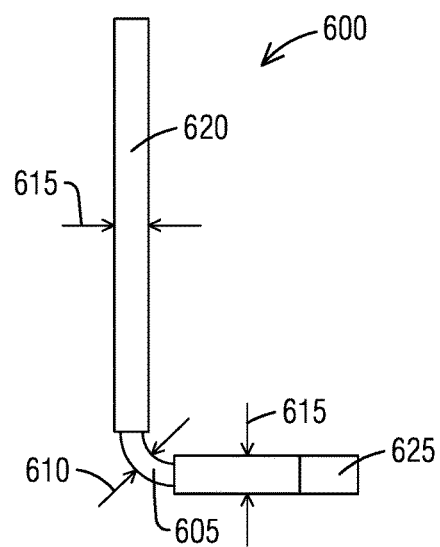
FIG. 6 illustrates a schematic of a side view of a bracket with a bend having a lesser thickness than a thickness of two arms of the bracket in accordance with an alternate embodiment of the present invention.

As seen in FIG. 6, it illustrates a schematic of a side view of a bracket 600 with a bend 605 having a lesser thickness (lt) 610 than an arm thickness (at) 615 of a first and a second arm 620, 625 of the bracket 600 in accordance with an alternate embodiment of the present invention. The bend 605 is a connecting portion between the first and second arms 620, 625. The lesser thickness (lt) 610 may be less than the arm thickness (at) 615. For example, in one embodiment, the lesser thickness (lt) 610 may be half that of the arm thickness (at) 615. The lesser thickness (lt) 610 being less than or half that of the arm thickness (at) 615 enables easy bending of the second arm 625 with the use of a tool as described earlier without compromising an overall strength of the bracket 600.

Figure 7:
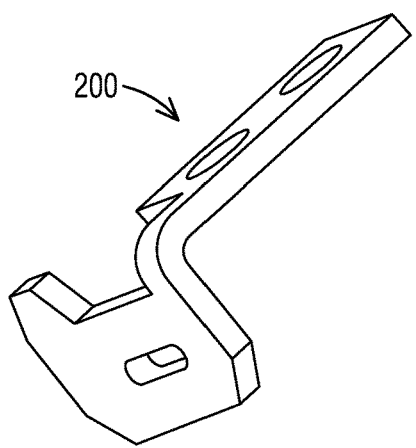

FIGS. 7-11 each illustrate an oblique view of the bracket 200 shown in FIG. 2 in accordance with an exemplary embodiment of the present invention. In FIG. 7, the bracket 200 is shown with a bend having a lesser width than two arms of the bracket 200 to secure an assembly to a side wall of an enclosure such as a power module enclosure. With regard to FIG. 8, a bracket assembly including first and second brackets like the bracket 200 may be used for the same purpose on two sides of the assembly. With respect to FIG. 9, the bracket 200 with a bend may have a combination of a lesser width than two arms of the bracket 200 and a lesser thickness (not shown) than a thickness of two arms of the bracket 200.

Figure 12:
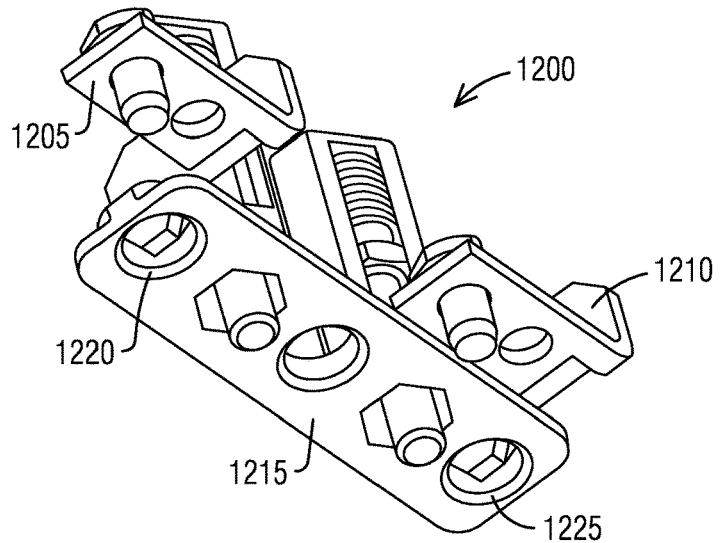
FIGS. 12-16 each illustrate an oblique view of a bracket assembly including first and second brackets to secure an assembly to a side wall of an enclosure in accordance with an exemplary embodiment of the present invention.
Figure 13:
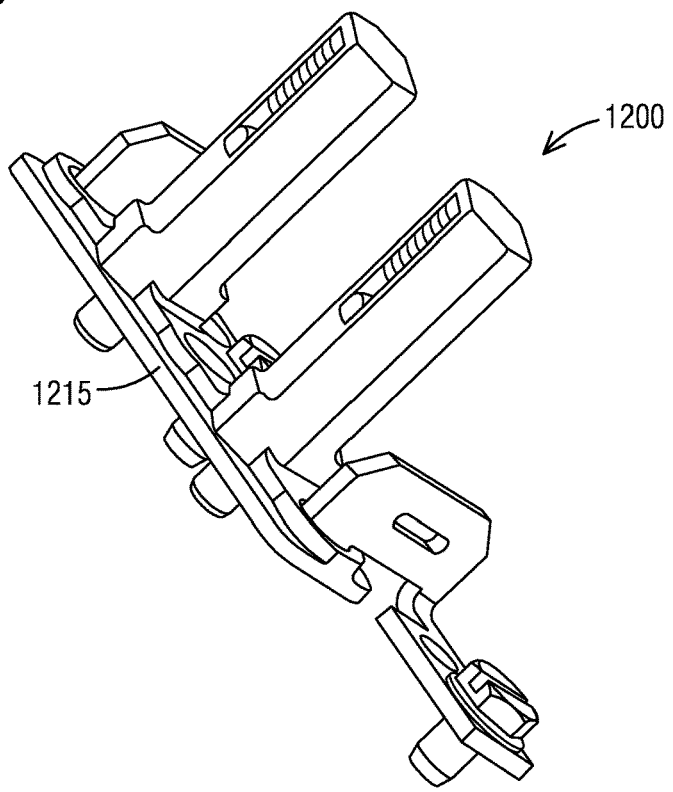
Figure 14:
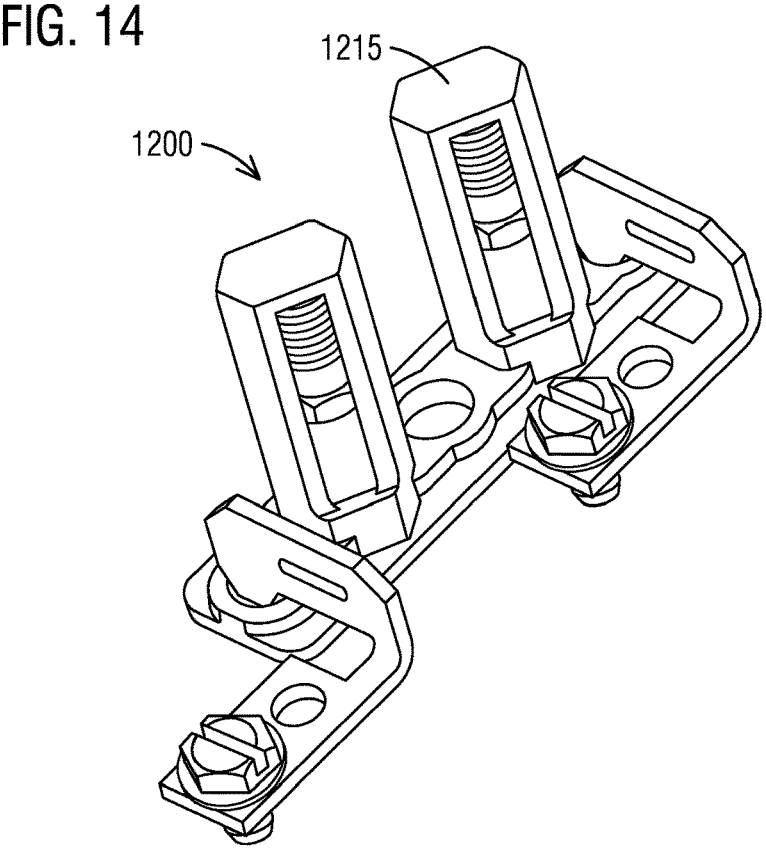
Figure 15:
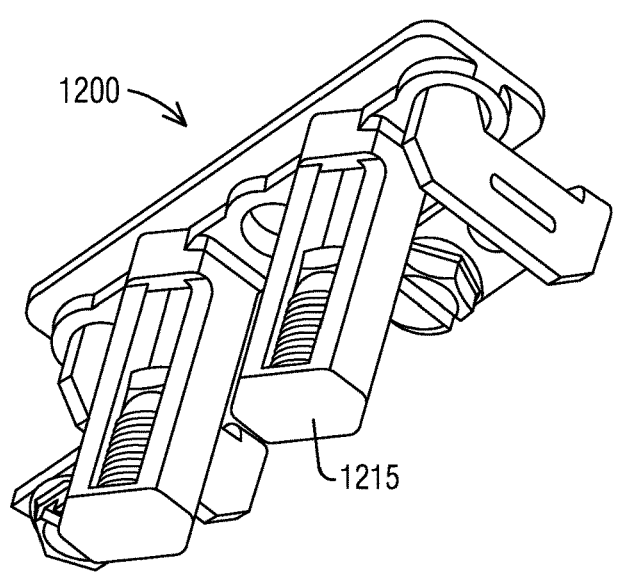
Figure 16:
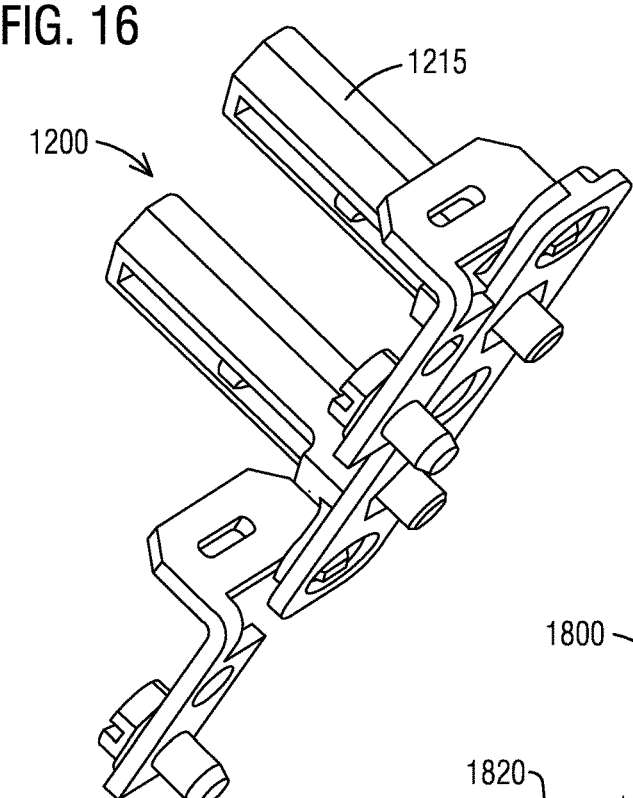

FIGS. 12-16 each illustrate an oblique view of a bracket assembly 1200 including first and second brackets 1205, 1210 to secure an assembly 1215 to a side wall of an enclosure (not shown) in accordance with an exemplary embodiment of the present invention. The assembly 1215 may include first and second holes 1220, 1225. In FIG. 12, the first and second brackets 1205, 1210 are shown with a bend having a lesser width than two arms of the brackets 1205, 1210. With regard to FIG. 13, the bracket assembly 1200 including the first and second brackets 1205, 1210 like the bracket 200 may be used for the purpose of securing the assembly 1215 on two sides of the assembly 1215. With respect to FIG. 14, the first and second brackets 1205, 1210 with a bend may have a combination of a lesser width than two arms of the brackets 1205, 1210 and a lesser thickness (not shown) than a thickness of two arms of the brackets 1205, 1210.

In one embodiment, the bracket assembly 1200 may provide in a power module enclosure a quick bolting feature to keep the assembly 1215 or a part in place until the assembly 1215 needs to be removed or used. The bracket 200 with a bend or the bracket assembly 1200 with a pair of brackets 1205, 1210 may be used depending upon the assembly 1215 or the part being held.

When the assembly 1215 needs to be removed then these brackets 1205, 1210 are simply bent away, thus releasing the assembly 1215 from the side wall of the enclosure on which it was installed. When the assembly 1215 does not need to be removed then the brackets 1205, 1210 just stay in place as-is.

There are many advantages of the bracket 200 with a bend or the bracket assembly 1200 with a pair of brackets 1205, 1210. For example, it may take half a turn of the hand with a screw-driver per each bracket 1205, 1210 to release the assembly 1215 from its position. There are no loose parts that can get misplaced. It is relatively faster to remove the assembly 1215 than un-screwing two bolts. It is also much easier to reach the pair of brackets 1205, 1210 directly from the front. There is no need to reach by hand deep in the enclosure. Smaller enclosures may be designed by needing comparably less space for a small tool that bends the pair of brackets 1205, 1210 instead of a tool that requires hand holding of the tool.

As used herein, "a bracket" or "a bracket assembly" refers to a component having multiple parts or requiring various degrees of effort and time to install or uninstall for securing numerous types of components to a structure in order to brace the components against any movement. The "bracket," or "the bracket assembly" in addition to the exemplary hardware description above, refers to a mechanism that is configured to removably provide a bracing functionality for securing a component such as an assembly to a structure such as a side wall of an enclosure. The "bracket," or "the bracket assembly" can include multiple interacting parts, whether located together or apart, that together perform processes as described herein.

The techniques described herein can be particularly useful for using a pair of brackets each with two holes and an opening. While particular embodiments are described in terms of a bracket assembly with a pair of left and right brackets, the techniques described herein are not limited to such a two-bracket configuration but can also be used in other configurations such as more than two brackets in a bracket assembly or more than two holes in a single bracket or more than one opening in a given bracket.

Figure 17:
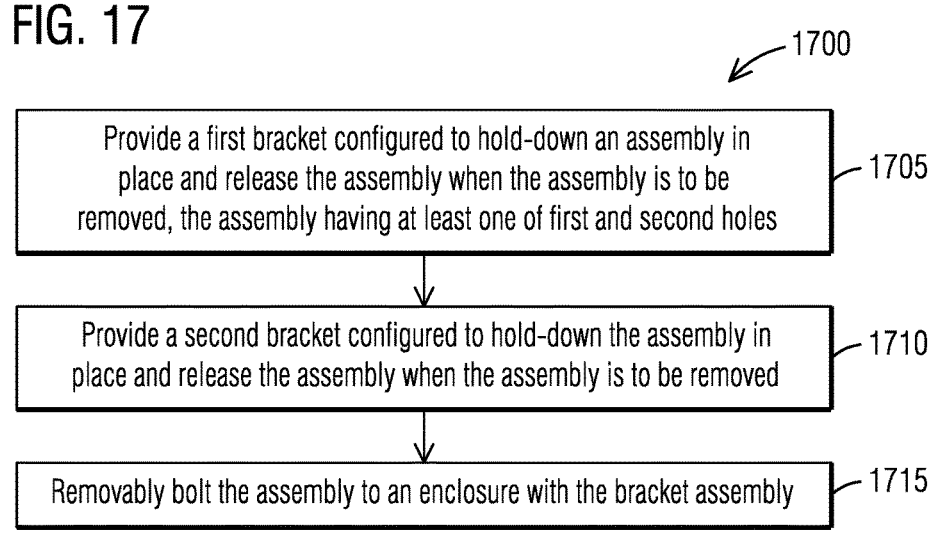
FIG. 17 illustrates a flow chart of a method of bolting an assembly to an enclosure with a bracket assembly in accordance with an exemplary embodiment of the present invention.

FIG. 17 illustrates a flow chart of a method 1700 of bolting the assembly 1215 to an enclosure with the bracket assembly 1200 in accordance with an exemplary embodiment of the present invention. Reference is made to the elements and features described in FIGS. 1-16. It should be appreciated that some steps are not required to be performed in any particular order, and that some steps are optional.

The method 1700 of bolting the assembly 1215 to an enclosure with the bracket assembly 1200, in step 1705, includes providing the first bracket 1205 configured to hold-down the assembly 1215 in place and release the assembly 1215 when the assembly 1215 is to be removed. The assembly 1215 has the first and second holes 1220, 1225. The first bracket 1205 includes a first arm having a first hole that is configured to receive a first fastener such as a first screw or a first rivet or having a portion configured for welding to an enclosure surface. The first bracket 1205 includes a second arm coupled to the first arm. The second arm has a first opening that is configured to receive a tool to bend the second arm for deforming the first bracket 1205 in a way that releases the assembly 1215. The second arm has a first nail feature to be inserted into one of the first and/or second holes 1220, 1225 of the assembly 1215 to hold-down the assembly 1215 in place.

The method 1700 of bolting the assembly 1215 to an enclosure with the bracket assembly 1200, in step 1710, further includes providing the second bracket 1210 configured to hold-down the assembly 1215 in place and release the assembly 1215 when the assembly 1215 is to be removed. The second bracket 1210 includes a first arm having a second hole that is configured to receive a second fastener as a second screw or a second rivet or having a portion configured for welding to the enclosure surface. The second bracket 1210 further includes a second arm coupled to the first arm. The second arm has a second opening that is configured to receive the tool to bend the second arm for deforming the second bracket 1210 in a way that releases the assembly 1215. The second arm having a second nail feature to be inserted into one of the first and/or second holes 1220, 1225 of the assembly 1215 to hold-down the assembly 1215 in place.

The method 1700, in step 1715, further includes bolting the assembly 1215 to an enclosure with the bracket assembly 1200 using the first and second brackets 1205, 1210 and a pair of spaced axially aligned fastener receiving holes or apertures such as the first and second holes 1220 of the assembly 1215.

Figure 18:
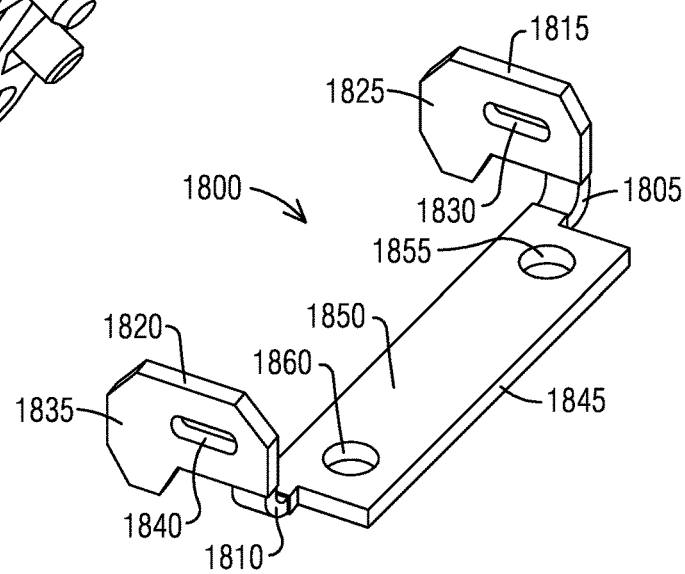
FIG. 18 illustrates a schematic of a bracket with a first bend and a second bend in accordance with an exemplary embodiment of the present invention.

FIG. 18 illustrates a schematic of a bracket 1800 with a first bend 1805 and a second bend 1810 in accordance with an exemplary embodiment of the present invention. The bracket 1800 includes a first arm 1815 and a second arm 1820 in accordance with an exemplary embodiment of the present invention. The bracket 1800 is configured to hold-down an assembly (not shown, see FIGS. 12-16) in place and release the assembly when the assembly is to be removed. The assembly may have first and/or second holes.

The bracket 1800 includes the first arm 1815 having a first major flat surface 1825 with a first hole 1830 that is configured to receive a tool to bend the first arm 1815. The second arm 1820 has a second major flat surface 1835 with a second hole 1840 that is configured to receive a tool to bent the second arm 1820. The bracket 1800 includes a third arm 1845 in between the first arm 1815 and the second arm 1820. The third arm 1845 includes a third major flat surface 1850 that includes a third hole 1855 and a fourth hole 1860 that are each configured to receive a fastener.

The third arm 1845 is configured to affix the bracket 1800 to a side wall of an enclosure and the first and second arms 1815, 1820 are configured to hold the assembly in place. The third arm 1845 is disposed transverse to the first major flat surface 1825 of the first arm 1815. For example, the third major flat surface 1850 may be disposed at 90° angle to the first major flat surface 1825. Likewise, the third arm 1845 is disposed transverse to the second major flat surface 1835 of the second arm 1820. For example, the third major flat surface 1850 may be disposed at 90° angle to the second major flat surface 1835.

Embodiments of the present invention to provide a bolt bracket or a bolt bracket assembly for use in securing an element to a fixed structure which can selectively accommodate either one, two, three or four fastening members for securing the bracket to the structure to meet different structural strength attachment requirements. Embodiments of the present invention to provide a removable bolt bracket or a removable bolt bracket assembly for use in securing a component to a fixed structure which provides an engagement between the component and the bracket or the bracket assembly to prevent relative movement between the component and the bracket or the bracket assembly.

Embodiments of the present invention to provide a mounting bracket to provide a variable footprint and thus better accommodate the available mounting space on the joist or other mounting surface while continuing to minimize any relevant movement between the mounting bracket and an object such as an assembly in the event of a disturbance. Embodiments of the present invention to provide a bracket or a bracket assembly which allows for substantial variations in the footprint of the bracket and the bracket assembly to fit on the available mounting surfaces of a fixed structure while continuing to maintain a positive engagement between the component and the components of the bracket and the bracket assembly.

Embodiments of the present invention to provide a bracket or a bracket assembly in that each bracket includes at least a pair of spaced axially aligned fastener receiving holes or apertures therein as shown in FIG. 1 for securement of the bracket to the side wall of an enclosure or the building joist. Depending on the space available and/or the number of fasteners needed for a particular application, the bracket can be mounted longitudinally with respect to the side wall of an enclosure as seen in FIG. 2.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A bracket apparatus comprising:
a first bracket configured to hold-down an assembly in place and release the assembly when the assembly is to be removed, the assembly having at least one of first and second holes, the first bracket including:
a first arm having a first major flat surface with a first hole therein that is configured to receive a first fastener, the first arm having a first end and a second end;
a second arm coupled to the second end of the first arm, the second arm having a second major flat surface having a first oblong orifice therein, the second arm having a first end and a second end; and
a connecting portion coupling the second end of the first arm and the first end of the second arm, wherein the connecting portion is a bend having a lesser width than an arm width of the first arm and the second arm, wherein the second major flat surface is disposed transverse to the first major flat surface of the first arm, wherein respective outer surfaces of the first arm, the connecting portion and the second arm are co-planar, and the connecting portion is the only structure coupling the first and second arms to one another;

wherein the second end of the second arm has a first nail feature configured to be inserted into one of the at least one of the first and second holes of the assembly to hold-down the assembly in place; and wherein the first oblong orifice of the second arm is configured to receive a tool to bend the second arm via a manual force for deforming the first bracket in order to release the assembly.

2. The bracket apparatus of claim 1, wherein the first arm and the second arm define an L-shape.

3. The bracket apparatus of claim 1, wherein the first oblong orifice is configured to receive a head of a flat screw-driver.

4. The bracket apparatus of claim 1, wherein the first arm and the second arm are made of a stamped piece of metal.

5. The bracket apparatus of claim 4, wherein the stamped piece of metal is steel.

6. The bracket apparatus of claim 5, wherein the steel is 14 gage.

7. The bracket apparatus of claim 1, wherein the first arm is configured to affix the bracket to a side wall of an enclosure and the second arm is configured to hold the assembly in place.

8. The bracket apparatus of claim 1, further comprising:
a second bracket configured to hold-down the assembly in place and release the assembly when the assembly is to be removed, the second bracket including:
a first arm having a first major flat surface with a second hole therein that is configured to receive a second fastener, the first arm having a first end and a second end;
a second arm coupled to the second end of the first arm, the second arm having a second major flat surface having a second oblong orifice therein, the second arm having a first end and a second end; and
a connecting portion coupling the second end of the first arm and the first end of the second arm, wherein the connecting portion is a bend having a lesser width than an arm width of the first arm and the second arm,
wherein the second major flat surface is disposed transverse to the first major flat surface of the first arm,
wherein respective outer surfaces of the first arm, the connecting portion and the second arm are co-planar, and the connecting portion is the only structure coupling the first and second arms to one another;
wherein the second end of the second arm has a second nail feature configured to be inserted into one of the first and second holes of the assembly to hold-down the assembly in place; and
wherein the second oblong orifice of the second arm is configured to receive a tool to bend the second arm via a manual force for deforming the second bracket in order to release the assembly.

9. The bracket apparatus of claim 8, wherein the first arm of the second bracket and the second arm of the second bracket define an L-shape.

10. The bracket apparatus of claim 8, wherein the second oblong orifice is configured to receive a head of a flat screw-driver.

11. The bracket apparatus of claim 8, wherein the first arm of the second bracket and the second arm of the second bracket are made of a stamped piece of metal.

12. The bracket apparatus of claim 11, wherein the stamped piece of metal is steel.

13. The bracket apparatus of claim 12, wherein the steel is 14 gage.

14. A bracket apparatus comprising:
a first bracket configured to hold-down an assembly in place and release the assembly, when the assembly is to be removed, the assembly having at least one of first and second holes, the first bracket including:
a first arm having a first major flat surface with a first hole therein that is configured to receive a first fastener, the first arm having a first end and a second end,
a second arm coupled to the second end of the first arm, the second arm having a second major flat surface having a first oblong orifice therein, the second arm having a first end and a second end, and
a connecting portion coupling the second end of the first arm and the first end of the second arm wherein the connecting onion is a bend having a lesser width than an arm width of the first arm and the second arm,
wherein the second major flat surface is disposed transverse to the first major flat surface of the first arm,
wherein respective outer surfaces of the first arm, the connecting portion and the second arm are co-planar, and the connecting portion is the only structure coupling the first and second arms to one another,
wherein the second end of the second arm has a first nail feature configured to be inserted into one of the at least one of the first and second holes of the assembly to hold-down the assembly in place; and
wherein the first oblong orifice of the second arm is configured to receive a tool to bend the second arm via a manual force for deforming the first bracket in order to release the assembly;
a second bracket configured to hold-down the assembly in place and release the assembly when the assembly is to be removed, the second bracket including:
a first arm having a first major flat surface with a second hole therein that is configured to receive a second fastener, the first arm having a first end and a second end,
a second arm coupled to the second end of the first arm, the second arm having a second major flat surface having a second oblong orifice therein, the second arm having a first end and a second end, and
a connecting portion coupling the second end of the first arm and the first end of the second arm, wherein the connecting portion is a bend having a lesser width than an arm width of the first arm and the second arm,
wherein the second major flat surface is disposed transverse to the first major flat surface of the first arm,
wherein respective outer surfaces of the first arm, the connecting portion and the second arm are co-planar, and the connecting portion is the only structure coupling the first and second arms to one anther, wherein the second end of the second arm has a second nail feature configured to be inserted into one of the at least one of the first and second holes of the assembly to hold-down the assembly in place, and wherein the second oblong orifice of the second arm is configured to receive e too to bend the second arm via a manual force for deforming the second bracket hi order to release the assembly.

15. The bracket apparatus of claim 14, wherein the first arm of the first bracket and the second arm of the first bracket define an L-shape and wherein the first arm of the second bracket and the second arm of the second bracket define an L-shape.

16. The bracket apparatus of claim 14, wherein the first oblong orifice is configured to receive a head of a flat screw-driver and wherein the second oblong orifice is configured to receive the head of the flat screwdriver.

17. A bracket apparatus of claim 14, wherein the first bracket and the second bracket are made of stamped metal.

18. The bracket apparatus of claim 17, wherein the stamped metal is steel.

19. A method of bolting an assembly to an enclosure with a bracket assembly; the method comprising:
  providing a first bracket configured to hold-down an assembly in place and release the assembly when the assembly is to be removed, the assembly having at least one of first and second holes, the first bracket including:
    a first arm having a first major flat surface with a first hole therein that is configured to receive a first fastener, the first arm having a first end and a second end,
    a second arm coupled to the second end of the first arm, the second arm having a second major flat surface having a first oblong orifice therein, the second arm having a first end and a second end, and
    a connecting portion coupling the second end of the first arm and the first end of the second arm, wherein the connecting portion is a bend having a lesser width than an arm width of the first arm and the second arm,
  wherein the second major flat surface is disposed transverse to the first major flat surface of the first arm,
  wherein respective outer surfaces of the first arm, the connecting portion and the second arm are co-planer, and the connecting portion is the only structure coupling the first and second arms to one another,
  wherein the second end of the second arm has a first nail feature configured to be inserted into one of the at least one of the first and second holes of the assembly to hold-down the assembly in place; and
  wherein the first oblong orifice of the second arm is configured to receive a tool to bend the second arm via a manual force for deforming the first bracket in order to release the assembly;
  providing a second bracket configured to hold-down the assembly in place and release the assembly when the assembly is to be removed, the second bracket including:
    a first arm having a first major flat surface with a second hole therein that is configured to receive a second fastener, the first arm having a first end and a second end;
    a second arm coupled to the second end of the first arm, the second arm having a second major flat surface having a second oblong orifice therein, the second arm having a first end and a second end, and
    a connecting portion coupling the second end of the first arm and the first end of the second arm, wherein the connecting portion is a bend having a lesser width than an arm width of the first arm and the second arm,
  wherein the second major flat surface is disposed transverse to the first major flat surface of the first arm,
  wherein respective outer surfaces of the first arm, the connecting portion and the second arm are co-planar, and the connecting portion is the only structure coupling the first and second arms to one another,
  wherein the second end of the second arm has a second nail feature configured to be inserted into one of the at least one of the first and second holes of the assembly to hold-down the assembly in place, and
  wherein the second oblong orifice of the second arm is configured to receive a tool to bend the second arm via a manual force for deforming the second bracket in order to release the assembly.

20. The method of claim 19, wherein the first arm of the first bracket and the second arm of the first bracket define an L-shape and wherein the first arm of the second bracket and the second arm of the second bracket define an L-shape.

* * * * *